United States Patent
Cheon et al.

(10) Patent No.: US 12,063,290 B2
(45) Date of Patent: Aug. 13, 2024

(54) OPERATING DEVICE AND METHOD USING MULTIVARIATE PACKING

(71) Applicant: Crypto Lab Inc., Seoul (KR)

(72) Inventors: Jung Hee Cheon, Seoul (KR); Andrey Kim, Seoul (KR); Donggeon Yhee, Jeongeup-Si (KR)

(73) Assignee: Crypto Lab Inc., Seoul (KR)

( * ) Notice: Subject to any disclaimer, the term of this patent is extended or adjusted under 35 U.S.C. 154(b) by 257 days.

(21) Appl. No.: 17/311,578

(22) PCT Filed: Dec. 6, 2019

(86) PCT No.: PCT/KR2019/017237
§ 371 (c)(1),
(2) Date: Jun. 7, 2021

(87) PCT Pub. No.: WO2020/117015
PCT Pub. Date: Jun. 11, 2020

(65) Prior Publication Data
US 2022/0029783 A1    Jan. 27, 2022

Related U.S. Application Data

(60) Provisional application No. 62/776,883, filed on Dec. 7, 2018.

(30) Foreign Application Priority Data

Dec. 5, 2019    (KR) ........................ 10-2019-0160996

(51) Int. Cl.
*H04L 9/00*   (2022.01)
*G06F 17/16*  (2006.01)
*H04L 9/30*   (2006.01)

(52) U.S. Cl.
CPC .............. *H04L 9/008* (2013.01); *G06F 17/16* (2013.01); *H04L 9/3093* (2013.01); *H04L 2209/34* (2013.01)

(58) Field of Classification Search
CPC ...... H04L 9/008; H04L 2209/34; G06F 17/16
See application file for complete search history.

(56) References Cited

U.S. PATENT DOCUMENTS

2011/0243320 A1* 10/2011 Halevi ................. H04L 9/0861
                                                              380/30
2017/0147835 A1    5/2017 Bacon et al.
(Continued)

FOREIGN PATENT DOCUMENTS

KR    10-2017-0142419 A    12/2017
KR        101861089 B1      5/2018

OTHER PUBLICATIONS

M. Franlkin et al., Efficient and Secure Evaluation of Multivariate Polynomials and Applications. In: Zhou J., Yung M. (eds) Applied Cryptography and Network Security. ACNS 2010. Lecture Notes in Computer Science, vol. 6123. Springer, Berlin, Heidelberg (19 pages).

(Continued)

*Primary Examiner* — Matthew T Henning
(74) *Attorney, Agent, or Firm* — Osha Bergman Watanabe & Burton LLP

(57) ABSTRACT

An encoding method includes: receiving a plurality of messages; encoding the plurality of messages into a polynomial defined by multivariates; and encrypting the polynomial defined by the multivariates to generate a homomorphic ciphertext. The plurality of messages may be multidimensionally packed by using multivariates, and thus, (Continued)

an operation may be performed with low complexity in the process of matrix multiplication for ciphertexts packed with the multivariates.

10 Claims, 12 Drawing Sheets

(56) References Cited

U.S. PATENT DOCUMENTS

2020/0151356 A1* 5/2020 Rohloff ............... G06F 21/6227
2021/0075588 A1* 3/2021 Khedr .................... H04L 9/008

OTHER PUBLICATIONS

J.H. Cheon et al., Homomorphic Encryption for Arithmetic of Approximate Nos. In: Takagi T., Peyrin T. (eds) Advances in Cryptology—Asiacrypt 2017. Asiacrypt 2017. Lecture Notes in Computer Science, vol. 10624. Springer, Cham (29 pages).
International Search Report issued in International Application No. PCT/KR2019/017237, mailed on Mar. 18, 2020 (7 pages).
Written Opinion issued in International Application No. PCT/KR2019/017237, mailed on Mar. 18, 2020 (4 pages).
Notice of Preliminary Rejection issued by the Korean Intellectual Property Office in corresponding Korean Application No. 10-2019-0160996 issued Aug. 5, 2021 (6 pages).

\* cited by examiner

Algorithm 1 Row Sum

1: procedure MHEAAN.RowSum($ct_A \in \mathcal{R'}_l^2$)
2:     $ct_S \leftarrow ct_A$
3:     for $j = 0$ to $\log n$ do
4:         $ct_j \leftarrow$ MHEAAN.Rotate($ct_S, 2^j, 0$)
5:         $ct_S \leftarrow$ MHEAAN.Add($ct_S, ct_j$)
6:     end for
7:     return $ct_S$
8: end procedure

Algorithm 2 Diagonal Extraction
---
1: procedure MHEAAN.DIAG($ct_A \in \mathcal{R}'^2_\ell, k, p$)
2:     $ct_{A_k} \leftarrow$ MHEAAN.CMult($ct_A, I_k$)
3:     $ct_{A_k} \leftarrow$ MHEAAN.ReScale($ct_{A_k}, p$)
4:     return $ct_{A_k}$
5: end procedure

FIG. 6

Algorithm 3 Matrix by Vector Multiplication

1: procedure MHEAAN.MATVECMULT($ct_{A^\tau}, ct_v \in \mathcal{R}'^2_l, p \in \mathbb{Z}$)
2:     $ct_{(Av)^\tau} \leftarrow$ MHEAAN.Mult($ct_{A^\tau}, ct_v$)
3:     $ct_{(Av)^\tau} \leftarrow$ MHEAAN.ReScale($ct_{(Av)^\tau}, p$)
4:     $ct_{(Av)^\tau} \leftarrow$ MHEAAN.ColSum($ct_{(Av)^\tau}$)
5:     return $ct_{(Av)^\tau}$
6: end procedure

FIG. 7

Algorithm 4 Matrix Multiplication

1: procedure MHEAAN.MATMULT($ct_A, ct_B \in \mathcal{R}'^2_k, p$)
2:     $ct_C \leftarrow 0$
3:     for $k = 0$ to $n - 1$ do
4:         $ct_{B_k} \leftarrow$ MHEAAN.Diag$_k(ct_B, p)$
5:         for $j = 1$ to $\log(n) - 1$ do
6:             $ct_{B_k} \leftarrow$ MHEAAN.Add($ct_{B_k}$, MHEAAN.Rotate($ct_{B_k}, (0, 2^j)$))
7:         end for
8:         $ct_{A_k} \leftarrow$ MHEAAN.ModDown(MHEAAN.Rotate($ct_A, (\frac{N_1}{2} - k, 0)), p$)
9:         $ct_{C_k} \leftarrow$ MHEAAN.Mult($ct_{A_k}, ct_{B_k}$)
10:        $ct_C \leftarrow$ MHEAAN.Add($ct_C, ct_{C_k}$)
11:    end for
12:    $ct_C \leftarrow$ MHEAAN.ReScale($ct_C, p$)
13:    return $ct_C$
14: end procedure

Algorithm 5 Matrix Multiplication with Permutations
---
1: procedure MHEAAN.MATMULTPERMUTE($ct_A, ct_{B'} \in \mathcal{R}'^2_\ell, p$)
2:     $ct_{C''} \leftarrow 0$
3:     for $k = 0$ to $n - 1$ do
4:         $ct_{A_k} \leftarrow$ MHEAAN.Rotate($ct_A, (k, 0)$)
5:         $ct_{B'_k} \leftarrow$ MHEAAN.Rotate($ct_{B'}, (k, k)$)
6:         $ct_{C''_k} \leftarrow$ MHEAAN.Mult($ct_{A_k}, ct_{B'_k}$)
7:         $ct_{C''} \leftarrow$ MHEAAN.Add($ct_C, ct_{C''_k}$)
8:     end for
9:     $ct_{C''} \leftarrow$ MHEAAN.ReScale($ct_{C''}, p$)
10:    return $ct_{C''}$
11: end procedure

FIG. 9

Algorithm 6 Matrix Transposition

1: procedure MHEAAN.MATTRANSPOSE($ct_A \in \mathcal{R}'^2_\ell, p$)
2:     $ct_A r \leftarrow 0$
3:     for $k = 0$ to $n - 1$ do
4:        $ct_{A_k} \leftarrow$ MHEAAN.Diag$_k$($ct_A, p$)
5:        $ct_{A_k} \leftarrow$ MHEAAN.Rotate($ct_{A_k}, (k, -k)$)
6:        $ct_A r \leftarrow$ MHEAAN.Add($ct_A r, ct_{A_k}$)
7:     end for
8:     $ct_{A_k} \leftarrow$ MHEAAN.ReScale($ct_{A_k}, p$)
9:     return $ct_{A_k}$
10: end procedure

FIG. 10

Algorithm 7 Matrix Inverse

1: procedure MHEAAN.MATINV($ct_{\bar{A}} \in \mathcal{R}'^{2}_{\ell}, r, p \in \mathbb{Z}$)
2:     $i = $ MHEAAN.Encode($\mathbf{I}, p$)
3:     $ct_{A_0} \leftarrow ct_{\bar{A}}$
4:     $ct_{V_0} \leftarrow$ MHEAAN.ModDown($i + ct_{\bar{A}}, p$)
5:     for $j = 0$ to $r - 1$ do
6:         $ct_{A_j} \leftarrow$ MHEAAN.ReScale(MHEAAN.MatMult($ct_{A_{j-1}}, ct_{A_{j-1}}$), $p$)
7:         $ct_{V_{j+1}} \leftarrow$ MHEAAN.ReScale(MHEAAN.MatMult($ct_{V_j}, i + ct_{A_j}$), $p$)
8:     end for
9:     $ct_{V_r} \leftarrow$ MHEAAN.ReScale($ct_{V_r}, t$)
10:     return $ct_{V_r}$
11: end procedure

Algorithm 8 Linear Transformation Column to Row

1: procedure MHEAAN.LTCoLRow($ct_a, ct_{W^T}, ct_b, r \in \mathcal{R'}^2_\ell, p \in \mathbb{Z}$)
2:     $ct_{(Wa)^T} \leftarrow$ MHEAAN.VecMatMult($ct_a, ct_{W^T}, p$)
3:     $ct_z, r \leftarrow$ MHEAAN.Add($ct_{(Wa)^T}, ct_b, r$)
4:     return $ct_z$
5: end procedure

Algorithm 9 Linear Transformation Row to Column
---
1: procedure MHEAAN.LTRowCol($ct_a r, ct_W, ct_b \in \mathcal{R}'^2_\ell, p \in \mathbb{Z}$)
2:     $ct_{W_a} \leftarrow$ MHEAAN.MatVecMult($ct_a r, ct_W, p$)
3:     $ct_z \leftarrow$ MHEAAN.Add($ct_{W_a}, ct_b$)
4:     return $ct_z$
5: end procedure
---

OPERATING DEVICE AND METHOD USING MULTIVARIATE PACKING

TECHNICAL FIELD

Apparatuses and methods consistent with the disclosure relate to an operating device and method using multivariate packing, and more particularly, to an operating device and method capable of generating a plurality of messages as a single ciphertext by arranging the messages in a multidimensional matrix using multivariates.

BACKGROUND ART

As communication technology has developed and electronic devices have become actively prevalent, efforts to maintain communication security between electronic devices have been continuously made. Accordingly, encryption/decryption technology has been used in most communication environments.

When a message encrypted by the encryption technology is delivered to a counterpart, the counterpart should perform decryption to use the message. In this case, resource and time are wasted for the counterpart in the process of decrypting the encrypted data. In addition, if a third party hacks while the counterpart temporarily decrypts the message for operation, the message may be easily leaked to the third party.

In order to solve this problem, homomorphic encryption methods have been studied. According to homomorphic encryption, even if an operation is performed on a ciphertext itself without decrypting encrypted information, the same result as that of a value obtained by operating a plain text and then encrypting the text may be obtained. Accordingly, various operations may be performed without decrypting the ciphertext.

However, the homomorphic encryption method of the related art is inefficient in terms of speed and cost in matrix multiplication.

DISCLOSURE

Technical Problem

The disclosure provides an operating device and method capable of generating a plurality of messages as a single ciphertext by arranging the messages in a multidimensional matrix using multivariates.

Technical Solution

According to an embodiment of the disclosure, an encryption method includes: receiving a plurality of messages; encoding the plurality of messages into a polynomial defined by multivariates; and encrypting the polynomial defined by the multivariates to generate a homomorphic ciphertext.

In this case, in the encoding, the plurality of messages may be arranged in a multidimensional tensor corresponding to the number of the multivariates and the plurality of messages arranged in the multidimensional tensor may be encoded into a polynomial.

Meanwhile, the multivariates may include a first variate and a second variate, and in the encoding, the plurality of messages may be arranged in a matrix form including a plurality of columns and a plurality of rows, and the plurality of messages arranged in the matrix form may be encoded into a polynomial defined by the first variate and the second variate.

In this case, in the encoding, each slot of the matrix may be converted into coefficients of the polynomial defined by the first variate and the second variate.

Meanwhile, the encryption method may further include performing computation processing on a plurality of homomorphic ciphertexts.

In this case, the computation processing may be a matrix multiplication, and the performing of the computation processing may include: performing a Hadamard product operation on the plurality of homomorphic ciphertexts, calculating a partial component value of a result of the matrix multiplication by adding components of a result of the Hadamard product operation; and repeating the Hadamard product operation and the calculating operation by shifting a component position in one of the plurality of homomorphic ciphertexts.

In this case, in the performing of Hadamard product operation, Hadamard product operation may be performed only on a component reflected for calculation of the partial component value among a plurality of components constituting the plurality of homomorphic ciphertexts.

According to another embodiment of the disclosure, an operating device includes: a memory configured to store at least one instruction and a plurality of predetermined prime number information; and a processor configured to execute the at least one instruction, wherein the processor encodes a plurality of messages into a polynomial defined by multivariates by executing the at least one instruction, and encrypts the polynomial defined by the multivariates to generate a homomorphic ciphertext.

In this case, the processor may arrange the plurality of messages in a multidimensional tensor corresponding to the number of the multivariates and encode the plurality of messages arranged in the multidimensional tensor into a polynomial.

Meanwhile, the multivariates may include a first variate and a second variate, and the processor may arrange the plurality of messages in a matrix form including a plurality of columns and a plurality of rows, and encode the plurality of messages arranged in the matrix form into a polynomial defined by the first variate and the second variate.

In this case, the processor may convert each slot of the matrix into coefficients of the polynomial defined by the first variate and the second variate.

Meanwhile, the processor may perform computation processing on a plurality of homomorphic ciphertexts.

In this case, the computation processing may be a matrix multiplication, and the processor may perform a Hadamard product operation on the plurality of homomorphic ciphertexts, calculate a partial component value of a result of the matrix multiplication by adding components of a result of the Hadamard product operation, and calculate the entire component value of the result of the matrix multiplication by repeating the Hadamard product operation and the calculating operation by shifting a component position in one of the plurality of homomorphic ciphertexts.

In this case, the processor may perform a Hadamard product operation for each component reflected in the calculation of the partial component value, among a plurality of components constituting the plurality of homomorphic ciphertexts.

Advantageous Effects

According to various embodiments of the disclosure as described above, a plurality of messages may be multidimensionally packed by using multiviariates, and thus, an operation may be performed with low complexity in the process of matrix multiplication for ciphertexts packed with the multiviariates.

DESCRIPTION OF DRAWINGS

FIG. 4 is a view illustrating a row summing method according to an embodiment of the disclosure;

FIG. 5 is a view illustrating a diagonal extraction method according to an embodiment of the disclosure;

FIG. 6 is a view illustrating a matrix by vector multiplication method according to an embodiment of the disclosure;

FIG. 7 is a diagram illustrating a matrix multiplication method according to an embodiment of the disclosure;

FIG. 8 is a view illustrating a matrix multiplication of a permutation matrix according to an embodiment of the disclosure;

FIG. 9 is a view illustrating a method of generating a transposition matrix according to an embodiment of the disclosure;

FIG. 10 is a view illustrating an inverse matrix operation method according to an embodiment of the disclosure;

FIG. 11 is a view illustrating a method of linear transformation from a column to a row according to an embodiment of the disclosure; and FIG. 12 is a view illustrating a method of linear transformation from a row to a column according to an embodiment of the disclosure.

BEST MODE

Mode for Invention

Hereinafter, the disclosure will be described in detail with reference to the accompanying drawings. In an information (data) transmission process performed in the disclosure, encryption/decryption may be applied as needed. In the disclosure and claims, expressions describing the information (data) transmission process are to be construed as including the case of performing encryption/decryption, even if not mentioned separately. Expressions such as "transmit (transfer) from A to B" or "receive by A from B" in the disclosure include transmission (transfer) or reception of another medium in between, and do not just represent direct transmission (transfer) from A to B or direct reception by A from B.

In the description of the disclosure, the order of each step should be understood in a non-limited manner unless a preceding step should be performed logically and temporally before a following step. That is, except for the exceptional cases as described above, even if a process described as a following step is preceded by a process described as a preceding step, it does not affect the nature of the disclosure, and the scope of rights should be defined regardless of the order of the steps. In addition, in the present specification, "A or B" is defined not only as selectively referring to either A or B, but also as including both A and B. In addition, in the present specification, the term "comprise" has a meaning of further including other components in addition to the components listed.

Only essential components necessary for explanation of the disclosure are described in the disclosure, and components not related to the essence of the disclosure are not mentioned. The disclosure should not be construed in an exclusive sense that includes only the recited elements but should be interpreted in a non-exclusive sense to include other elements as well.

In the disclosure, the term "value" is defined as including not only a scalar value but also a vector and a polynomial.

A mathematical computation and calculation of each step of the disclosure to be described later may be implemented by a computer operation by a well-known coding method for carrying out the computation or the calculation, and/or coding designed suitable for the disclosure.

Specific expressions described below are exemplarily described among various possible alternatives, and the scope of the disclosure should not be construed as being limited to the expressions mentioned in the disclosure.

For convenience of explanation, the following notations will be used in the disclosure.

a←D: Element (a) is selected according to distribution (D)

$s_1, s_2 \in R$: Each of S1 and S2 is an element of a set R.

mod(q): A modular computation is performed by an element q.

$\lceil \cdot \rceil$: An internal value is rounded up

Hereinafter, various embodiments of the disclosure will be described in detail with reference to the accompanying drawings.

Figure 1:
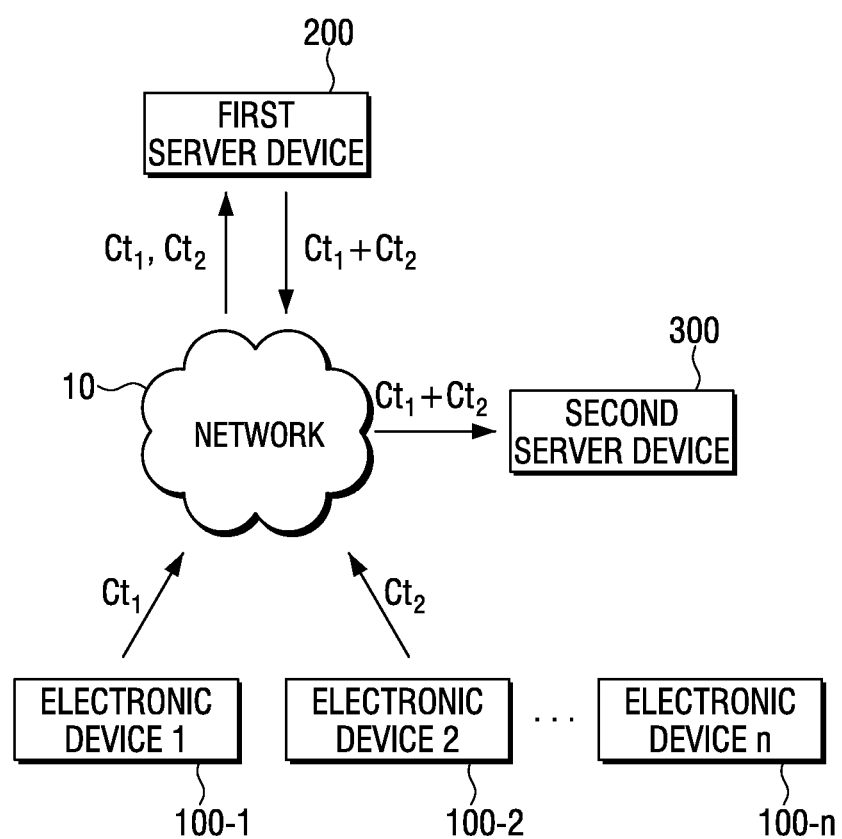
FIG. 1 is a view illustrating a structure of a network system according to an embodiment of the disclosure.

FIG. 1 is a diagram illustrating a network system according to an embodiment of the disclosure.

Referring to FIG. 1, the network system may include a plurality of electronic devices 100-1 to 100-n, a first server device 200, and a second server device 300, and the respective components may be connected to one another through a network 10.

The network 10 may be implemented by various types of wired and wireless communication networks, a broadcasting communication network, an optical communication network, a cloud network, or the like, and the respective devices may be connected to each other by a method such as wireless fidelity (Wi-Fi), Bluetooth, and near field communication (NFC), without a separate medium.

Although FIG. 1 illustrates a plurality of electronic devices 100-1 to 100-n, it is not necessary that the plurality of electronic devices are used, and only one electronic device may be used. As an example, the electronic devices 100-1 to 100-n may be implemented by various types of devices such as a smartphone, a tablet personal computer (PC), a game machine, a PC, a laptop PC, a home server, and a kiosk, and may also be implemented by a home appliance with an Internet of Things (IoT) function.

A user may input various information through the electronic devices 100-1 to 100-n that the user uses. The input information may be stored in the electronic devices 100-1 to 100-n and may also be transmitted to and stored in an external device for a reason such as capacity and security. In FIG. 1, the first server device 200 may serve to store such information and the second server device 300 may serve to use a portion or the entirety of information stored in the first server device 200.

Each of the electronic devices 100-1 to 100-n may perform homomorphic encryption on the input information and transmit a homomorphic ciphertext to the first server device 200.

Each of the electronic devices 100-1 to 100-n may allow an encryption noise calculated in a process of performing the homomorphic encryption, i.e., an error, to be included in the ciphertext. For example, the homomorphic ciphertext generated by each of the electronic devices 100-1 to 100-n may be generated in a form in which a result value including a message and an error value is restored when the homomorphic ciphertext is decrypted using a secret key later.

For example, the homomorphic ciphertexts generated by the respective electronic devices 100-1 to 100-n may be generated in a form satisfying the following properties when decrypted using a secret key.

$$Dec(ct,sk) = <ct,sk> = M+e \pmod{q} \quad \text{[Equation 1]}$$

Here, < and > refer to a usual inner product, ct denotes a ciphertext, sk denotes a secret key, M denotes a plaintext message, e denotes an encryption error value, and mod q denotes a modulus of the ciphertext. It is necessary for q to be selected to be larger than a result value M obtained by multiplying a message by a scaling factor $\Delta$. As long as an absolute value of the error value e is sufficiently smaller than M, a decryption value (M+e) of the ciphertext may replace the original message with the same precision in significant digit arithmetic. In decrypted data, the error may be arranged on the least significant bit (LSB) side and M may be arranged on the second least significant bit side.

In case that a size of the message is excessively small or large, the size of the message may be adjusted using the scaling factor. In case of using the scaling factor, a message in a real number form, as well as a message in an integer form, may be encrypted and thus availability may be significantly improved. Further, a size of an area where messages are present in a ciphertext after the computation, i.e., a size of an effective area, may be adjusted by adjusting the size of the message using the scaling factor.

According to an embodiment, the modulus q of the ciphertext may be set in various forms and used. As an example, the modulus of the ciphertext may be set in a form of exponentiation of the scaling factor $\Delta$, i.e., $q=\Delta^L$. In case that $\Delta$ is 2, the modulus of the ciphertext may be set in a form of, for example, $q=2^{10}$. Alternatively, q may be expressed as a combination of exponentiations of 2 satisfying a certain condition as illustrated in FIG. 8.

As another example, the modulus of the ciphertext may be set to a value obtained by multiplying a plurality of different scaling factors. The respective factors may be set to values within similar ranges, i.e., similar values. For example, the scaling factors may be set so that $q=q_1 q_2 q_3 \ldots q_x$, and $q_1, q_2, q_3, \ldots, q_x$ may each have a value similar to the scaling factor $\Delta$ and may be set to values that are disjoint from each other.

Meanwhile, each of the electronic devices 100-1 to 100-n may generate a plurality of pieces of information as one homomorphic ciphertext. For example, the electronic device 100 may store various information such as GPS information, user ID information, and gender information, and the electronic device 100 may pack the various information as described above to generate one homomorphic ciphertext. The packing operation will be described later.

The first server device 200 may store the received homomorphic ciphertext as it is without performing decryption.

The second server device 300 may request a specific processing result of the homomorphic ciphertext from the first server device 200. The first server device 200 may perform a specific computation according to the request from the second server device 300 and then transmit a result of the computation to the second server device 300.

As an example, in case that ciphertexts ct1 and ct2 transmitted by two electronic devices 100-1 and 100-2 are stored in the first server device 200, the second server device 300 may request for a value obtained by adding up information provided from the two electronic devices 100-1 and 100-2, from the first server device 200. The first server device 200 may perform a computation of adding up two ciphertexts according to the request and then transmit a result value (ct1+ct2) to the second server device 300.

Due to a quality of the homomorphic ciphertext, the first server device 200 may perform computation without performing decryption and a result value of the computation may also have a ciphertext form.

The first server device 200 may transmit a computation result ciphertext to the second server device 300. The second server device 300 may decrypt the received computation result ciphertext to obtain a computation result value of data included in each homomorphic ciphertext. Further, the first server device 200 may perform computation multiple times according to a user request.

Meanwhile, the first server device 200 may store a learning model for outputting a preset result, and the first server device 200 may learn the learning model using the homomorphic ciphertext described or may put the homomorphic ciphertext in the learning model to output a computation result. Such a learning model may have a deep neural network (DNN) structure.

Meanwhile, although FIG. 1 illustrates the case that the first and second electronic devices perform encryption and the second server device performs decryption, the disclosure is not limited thereto.

Figure 2:
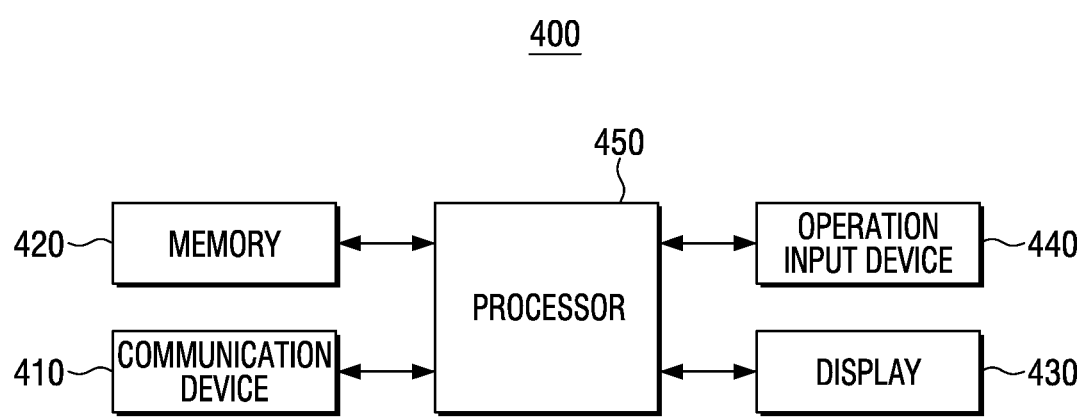
FIG. 2 is a block diagram illustrating a configuration of an operating device according to an embodiment of the disclosure.

FIG. 2 is a block diagram illustrating a configuration of an operating device according to an embodiment of the disclosure.

For example, in the system of FIG. 1, a device which performs homomorphic encryption, such as the first electronic device or the second electronic device, a device which performs a computation on a homomorphic ciphertext, such as the first server device, a device which performs decryption on the homomorphic ciphertext, such as the second server device, or the like may be referred to as an operating device. Such an operating device may be various types of devices such as a PC, a notebook PC, a smartphone, a tablet PC, a server, and the like.

Referring to FIG. 2, an operating device 400 may include a communication device 410, a memory 420, a display 430, an operation input device 440, and a processor 450.

The communication device 410 is formed to connect the operating device 400 to an external device (not shown), and may be connected to the external device through a local area network (LAN) and the Internet or may be connected to the external device through a universal serial bus (USB) port or a wireless communication (e.g., Wi-Fi 802.11a/b/g/n, NFC, or Bluetooth) port. Such a communication device 410 may also be referred to as a transceiver.

The communication device 410 may receive a public key from the external device and may transmit a public key generated by the operating device 400 itself to the external device.

Further, the communication device 410 may receive a message from the external device and may transmit a generated homomorphic ciphertext to the external device.

Further, the communication device 410 may receive various parameters required for ciphertext generation from the external device. Meanwhile, in an actual implementation, various parameters may be directly input by the user through the operation input device 440 as described later.

Further, the communication device 410 may receive a request for a computation for the homomorphic ciphertext from the external device and may transmit a result of the computation to the external device. Here, the requested computation may be a computation such as addition, subtraction, or multiplication (e.g., modular multiplication) and may be a matrix addition or a matrix transformation. Various computation operations will be described later with reference to FIGS. 4 to 12.

The memory 420 may store at least one instruction related to the operating device 400. For example, the memory 420 may store various programs (or software) for operation of the operating device 400 according to various embodiments of the disclosure.

Such a memory 420 may be implemented in various forms such as a random access memory (RAM), a read only memory (ROM), a flash memory, a hard disk drive (HDD), an external memory, and a memory card, but is not limited thereto.

The memory 420 may store a message to be encrypted. Here, the message may be various information used by the user such as credit information and personal information used by the user or may be information related to usage history or the like, such as position information or Internet use time information.

Further, the memory 420 may store a public key, and in case that the operating device 400 directly generates a public key, the memory 420 may store various parameters required for generation of a public key and a secret key.

The memory 420 may store the homomorphic ciphertext generated in the process to be described later. In addition, the memory 420 may store homomorphic ciphertext transmitted from an external device. Also, the memory 420 may store an operation result ciphertext as a result of an operation process to be described later.

The memory 420 may store a learning model. Such a learning model may be learned using a homomorphic ciphertext, and a matrix operation may be used in an operation process of the learning model.

The display 430 displays a user interface window for the user to select a function supported by the operating device 400. For example, the display 430 may display a user interface window for the user to select various functions provided by the operating device 400. Such a display 430 may be a monitor such as a liquid crystal display (LCD) monitor or an organic light emitting diode (OLED) monitor or may be implemented as a touch screen which may also perform a function of the operation input device 440 as described later.

The display 430 may display a message for requesting an input of a parameter required for generation of a secret key and a public key. Meanwhile, in an actual implementation, an encryption target may be directly selected by the user or may be automatically selected. That is, personal information requiring encryption or the like may be automatically set without direct selection of a message by the user.

The operation input device 440 may receive selection of a function of the operating device 400 and a control command for the corresponding function from the user. For example, the operation input device 440 may receive a parameter required for the generation of the secret key and the public key from the user. Further, the user may set a message to be encrypted, through the operation input device 440.

The processor 450 controls a general operation of the operating device 400. For example, the processor 450 may control the general operation of the operating device 400 by executing at least one instruction stored in the memory 420. Such a processor 450 may be implemented as a single device such as a central processing unit (CPU) or an application-specific integrated circuit (ASIC) or may be implemented as a plurality of devices such as a CPU and a graphics processing unit (GPU).

When a message to be transmitted is input, the processor 450 may store the message in the memory 420. Then, the processor 450 may perform homomorphic encryption on the message using various setting values and programs stored in the memory 420. In this case, the public key may be used.

The processor 450 may generate the public key required for the encryption by itself or may receive the public key from the external device. As an example, the second server device 300 which performs decryption may distribute the public key to other devices.

In case that the processor 450 generates the public key by itself, the processor 450 may generate the public key using ring learning with errors (Ring-LWE). For example, the processor 450 may first set various parameters and rings and store the parameters and rings in the memory 420. Examples of the parameters may include a bit length of a plaintext message, a size of the public key, and a size of the secret key.

The ring may be expressed by the following equation.

$$R = \mathbb{Z}_q[x]/(f(x)) \qquad \text{[Equation 2]}$$

Here, R denotes the ring, Zq denotes a coefficient, and f(x) denotes an n-th polynomial.

The ring, as a set of polynomials with a predetermined coefficient, refers to a set in which addition and multiplication are defined between elements and which is closed with respect to addition and multiplication. Such a ring may also be referred to as a polynomial ring.

As an example, the ring refers to a set of n-th polynomials with a coefficient of Zq. For example, if n is Φ(N), f(x) may refer to an N-th cyclotomic polynomial. (f(x)) denotes an ideal of Zq[x] generated by f(x). Euler's totient function Φ(N) denotes the number of natural numbers that are disjoint from N and are smaller than N. When $\Phi_N(x)$ is defined as an N-th cyclotomic polynomial, the ring may also be expressed by the following Equation 3.

$$R = \mathbb{Z}_q[x]/(\Phi_N(x)) \qquad \text{[Equation 3]}$$

Meanwhile, the ring in Expression 3 may have a complex number in a plaintext space. Meanwhile, in order to increase a computation speed for the homomorphic ciphertext, only a set including a plaintext space that is a real number, among the sets as the ring described above, may be used.

When such a ring is set, the processor 450 may calculate a secret key sk from the ring.

$$sk \leftarrow (1, s(x)), s(x) \in R \qquad \text{[Equation 4]}$$

Here, s(x) denotes a polynomial randomly generated with a small coefficient.

Further, the processor 450 may calculate a first random polynomial (a(x)) from the ring. The first random polynomial may be expressed as follows $$a(x) \leftarrow R \qquad \text{[Equation 5]}$$

In addition, the processor 450 may calculate an error. For example, the processor 450 may extract an error from a discrete Gaussian distribution or a distribution within a short statistical distance thereto. Such an error may be expressed as follows.

$$e(x) \leftarrow D_{\alpha q}^n \qquad \text{[Equation 6]}$$

When even the error is calculated, the processor 450 may perform a modular computation on the error with the first random polynomial and the secret key to calculate a second random polynomial. The second random polynomial may be expressed as follows.

$$b(x) = -a(x)s(x) + e(x) \pmod{q} \qquad \text{[Equation 7]}$$

Finally, the public key pk may be set as follows in a form in which the first random polynomial and the second random polynomial are included.

$$pk = (b(x), a(x)) \qquad \text{[Equation 8]}$$

The key generation method described above is only an example, and the disclosure is not necessarily limited thereto and the public key and the secret key may be generated using other methods.

Meanwhile, when the public key is generated, the processor 450 may control the communication device 410 to transmit the public key to other devices.

Further, the processor 450 may generate a homomorphic ciphertext for the message. For example, the processor 450 may generate a homomorphic ciphertext by applying the public key generated as described above to the message.

A message to be decrypted may be received from an external source or may be input from an input device directly provided in or connected to the operating device 400. For example, in case that the operating device 400 includes a touch screen or a key pad, the processor 450 may store data input by the user through the touch screen or the key pad in the memory 420 and subsequently perform encryption on the data. The generated homomorphic ciphertext may be restored to a result value obtained by adding an error to a value reflecting the scaling factor in the message, when decrypted.

Further, when the homomorphic ciphertext is generated, the processor 450 may store the homomorphic ciphertext in the memory 420 or control the communication device 410 to transmit the homomorphic ciphertext to another device according to a user request or a predetermined default command.

Meanwhile, according to an embodiment of the disclosure, packing may be performed at the time of encryption. Here, packing refers to generating a plurality of messages as a single ciphertext.

In case of using the packing in the homomorphic encryption, it is possible to encrypt multiple messages to a single ciphertext. In this case, when the operating device 400 performs a computation on each ciphertext, computations for multiples messages are performed in parallel, and as a result, a computation load is significantly reduced.

For example, in case that a message includes a plurality of message vectors, the processor 450 may convert the plurality of message vectors into a polynomial in a form that may be encrypted in parallel.

In this case, the processor 450 may convert the plurality of messages into a polynomial defined by multivariates to generate a homomorphic ciphertext. For example, the processor 450 may arrange the plurality of messages as multidimensional tensors corresponding to the number of multivariates and may convert the plurality of messages arranged as multidimensional tensors into a polynomial. Here, multivariates refer to a plurality of independent variates, and the tensor is a geometric quantity used to indicate two or more independent directions.

That is, when the multivariates have two variates including a first variate (x) and a second variate (y), the plurality of messages may be arranged in a matrix form including a plurality of columns and a plurality of rows and the plurality of messages (i.e., each slot of the matrix) arranged in the matrix form may be converted into a coefficient of a polynomial defined by the first variate and the second variate to perform encoding. A specific operation of such a multivariate packing operation will be described later. Accordingly, a ciphertext obtained by packing the plurality of message vectors may be generated.

Also, the processor 450 may multiply the generated polynomial by a scaling factor and perform homomorphic encryption thereon using a public key. Further, in case that the homomorphic ciphertext needs to be decrypted, the processor 450 may generate a deciphered information in a polynomial form by applying the secret key to the homomorphic ciphertext and generate the message by decoding the deciphered information in a polynomial form. The generated message here may include the error as mentioned in the description of Equation 1 above.

Also, the processor 450 may perform a computation on the ciphertext.

For example, the processor 450 may perform a computation such as addition, subtraction, or multiplication while maintaining an encrypted state of the homomorphic ciphertext. Also, the processor 450 may perform a matrix operation on the homomorphic ciphertext in the encrypted state.

Specifically, when the plurality of messages are arranged as a multidimensional tensor, matrix transformation in the message state and matrix transformation in the encrypted state (i.e., homomorphic ciphertext state) are the same. Even when matrix operation on ciphertext is required, the operation may be performed in the ciphertext state without having to decrypt the ciphertext into plaintext.

Meanwhile, when the operation is completed, the electronic device 100 may detect data of an effective area from operation result data. For example, the terminal device 100 may perform rounding processing on the operation result data to detect data of an effective area.

Here, the rounding processing refers to rounding off the message in the encrypted state, which may also be referred to as rescaling. For example, the electronic device 100 may eliminate a noise area by multiplying each component of the ciphertext by $\Delta^{-1}$, which is a reciprocal number of the scaling factor, and rounding off a result thereof. The noise area may be determined to correspond to a size of the scaling factor. As a result, a message of an effective area without the noise area may be detected. Since the rounding processing is performed in the encrypted state, an additional error may occur but a size of the error is small enough to be ignored.

Further, in case that a weight of an approximate message in the computation result ciphertext exceeds a threshold, the electronic device 100 may expand a plaintext space of the computation result ciphertext. For example, in case that q is smaller than M in Equation 1, M+e (mod q) has a different value from that of M+e, and thus, decryption cannot be performed. Therefore, a value of q needs to be always larger than M. However, as the computation proceeds, the value of q is gradually decreased. The expansion of the plaintext space refers to changing the ciphertext ct into a ciphertext with a larger modulus. The operation of expanding the plaintext space may also be referred to as rebooting. As the rebooting is performed, the ciphertext may become computable.

Meanwhile, a packing operation according to the disclosure will be described hereinafter.

MHEAAN to be described below is a generalization of HEAAN using a tensor packing method and multidimensional rotation.

First, multivariate RLWE (m-RLWE) is application of the existing Ring-LWE technique by multivariates as shown in Equation 9 below.

$$\mathbb{Z}_{[x_0,x_1]/(x_0^{N_0}+1,x_1^{N_1}+1)} \quad \text{[Equation 9]}$$

Here, $N_0$ and $N_1$ are powers of two.

Meanwhile, assuming $x_1 = x_0^{N_0/N_1}$, Equation 9 may be expressed as $\mathbb{Z}[x_0]/(x_0^{N_0}+1)$, which is the same as the existing Ring-LWE technique.

As such, the MHEAAN technique of the disclosure is based on m-RLWE having $x_1$, $x_2$ (generally $x_1, \ldots, x_s$) satisfying a cyclotomic polynomial.

As described above, MHEAAN is a generalization of HEAAN to the case of M power. For example, encryption processing in MHEAAN may be expressed as follows.

First, 1) m(x) belonging to a ring may be generated by encoding a tensor having a complex value having a size of $\hat{z}$ using $\tau'_{N_k}^{-1}$. Also, 2) Masking is performed with a result of m-RLWE instance (a(x), b(x)) corresponding to ring ($R'_1$), and 3) a message (m(x)) with the tensor ($\hat{z}$) encoded therein is encrypted to generate a homomorphic ciphertext ct. The ciphertext generated through this process may be referred to as an encrypted tensor.

HEAAN as described above may be expressed as a special case that s=0 in MHEAAN as shown in Equation 10 below.

$$z = \begin{bmatrix} z_0 \\ z_1 \\ \vdots \\ z_{n_0-1} \end{bmatrix} \xrightarrow[\text{Encode}]{\tau'^{-1}_{n_0}} m(x) \xrightarrow[\text{Enc}]{\text{RLWE}} ct \quad \text{[Equation 10]}$$

Meanwhile, when s=1, i.e., two-dimensional (2D) packing may be expressed by the following Equation 11.

$$Z = \begin{bmatrix} z_{0,0} & z_{0,1} & \cdots & z_{0,n_1-1} \\ z_{1,0} & z_{1,1} & \cdots & z_{1,n_1-1} \\ \vdots & \vdots & \ddots & \vdots \\ z_{n_0-1,0} & z_{n_0-1,1} & \cdots & z_{n_0-1,n_1-1} \end{bmatrix} \xrightarrow[\text{Encode}]{\tau'^{-1}_{n_0,n_1}} \quad \text{[Equation 11]}$$

$$m(x_0, x_1) \xrightarrow[\text{Enc}]{m\text{-RLWE}} ct$$

Specifically, referring to Equation 11, a plurality of messages may be encoded as a message defined by multivariates, and the corresponding message may be encrypted to generate a homomorphic ciphertext.

Hereinafter, various arithmetic operations in MHEAAN will be described.

Key Generation (MHEAAN.KeyGEN($1^\lambda$))

Key generation is an operation for generating various parameter values required for MHEAAN, and when a security parameter ($\lambda$) is given, an integer (M) corresponding to the cyclotomic ring, an integer (L) corresponding to the largest ciphertext modulus level), and variance parameters ($\rho$, $\sigma$, and h) may be set (or output).

Also, a distribution ($X_{enc}=ZO(\rho)$, $X_{err}=DG(\sigma)$, $X_{key}=HWT(h)$) to be used in each process of secret, error, and encryption may be set, and a secret ($s \leftarrow X_{key}$), random ($a \leftarrow R'_L$), error ($e \leftarrow X_{err}$), and the like may be calculated from the set distribution.

In addition, a secret key ($sk \leftarrow (s, 1)$), a second random ($b \leftarrow -a \cdot s + e + 2^L s(\text{mod } R'_{2 \cdot L})$), and a public key ($pk \leftarrow (a, b) \in R'^2_L$) may be calculated using the calculated secret, random, and error.

Key Generation (MHEAAN.KeyGEN$_{sk}$(s))

As a computation to generate a switching key and an evaluation key to be used in the ciphertext computation process, the switching key may be output as shown in the following Equation 12 and the evaluation key may be output as shown in the following Equation 13.

$$swk \leftarrow (a,b) \in R'^2_{2 \cdot L} \quad \text{[Equation 12]}$$

Here, a is a value calculated from $R'_{2 \cdot L}$, and b is a value calculated from $-a \cdot s + e + 2^L s(\text{mod } R'_{2 \cdot L})$.

$$evk \leftarrow \text{MHEAAN.KSGen}_{sk}(s_2) \quad \text{[Equation 13]}$$

Encoding (MHEAAN.Encode($\hat{z}$, p))

Encoding is an operation for arranging a plurality of messages as a multidimensional tensor corresponding to the number of multivariates and encoding the plurality of messages arranged as the multidimensional tensor into a polynomial. Referring to Equation 14 below, the tensor corresponding to the plurality of messages may be converted into a polynomial.

$$m \leftarrow \tau'_n(2^p \cdot \hat{z}) \in R' \quad \text{[Equation 14]}$$

Here, m is a polynomial having multivariates, $\hat{z}$ is a tensor satisfying $\hat{z} \in \mathbb{C}^n$, n is equal to or less than N/2, and p is an integer less than 1.

Decoding (MHEAAN.Decode(m, p))

The decoding is an operation for converting a plaintext (polynomial) into a tensor using Equation 15 as follows.

$$m \leftarrow \tau'_n(2^p \cdot \hat{z}) \in R' \quad \text{[Equation 15]}$$

Here, $\hat{z}$ is a tensor satisfying $\hat{z} \in \mathbb{C}$ p is a precision bit, and m is a plaintext in the form of a polynomial.

Encryption (MHEAAN.Enc$_{pk}$(m))

Encryption operation is an operation to convert a polynomial-type plaintext into a homomorphic ciphertext, i.e., an operation of performing encryption processing.

$$ct = v \cdot pk + (e_0, e_1 + m)(\text{mod } R'_L) \quad \text{[Equation 16]}$$

Here, ct is the ciphertext, v is a value calculated from $X_{enc}$, each of $e_0$ and $e_1$ is an error sampled from $X_{err}$, and pk is a public key.

Decryption (MHEAAN.Dec$_{sk}$(ct))

Decryption is an operation to convert ciphertext into plaintext. In this decryption operation process, $c_o \cdot s + c_1(\text{mod } R'_1)$ may be output for the ciphertext (ct=($c_o$, $c_1$)$\in R'^2_1$) defined by multivariates.

Addition (MHEAAN.Add(ct$_1$, ct$_2$))

Addition is an operation to output a sum value (ct$_{add} \leftarrow$ ct$_1$+ct$_2$) of two input homomorphic ciphertexts ct$_1$ and ct$_2$, and the sum value ct$_{add}$ may be a ciphertext for a tensor $\hat{z} + \hat{z}_2$.

Constant Multiplication Operation (MHEAAN.CMulteevk(ct,C,p))

The constant multiplication operation is an operation of multiplying a constant value by a homomorphic ciphertext, and the following Equation 17 may be calculated by encoding a constant tensor corresponding to a constant value and using an encoded tensor and the ciphertext.

$$ct_{cmult} \leftarrow c \cdot ct(\text{mod } R' \ell) \quad \text{[Equation 17]}$$

Here, c is an encoded constant tensor, ct is a ciphertext, and $Ct_{cmult}$ may be a constant product value for the homomorphic ciphertext, which may be a ciphertext for $\hat{z}\odot\hat{c}$.

Polynomial Multiplication Operation (MHEAAN.PolyMult$_{evk}$(ct, g, p))

The polynomial multiplication operation is an operation of multiplying the homomorphic ciphertext by a polynomial-type constant (c), which is the same as the constant multiplication operation described above, except that there is no step of encoding the constant tensor.

Multiplication Operation (MHEAAN.Mult$_{evk}$(ct$_1$, ct$_2$))

The multiplication operation is an operation of outputting a multiplication value (ct$_{mult}$←(d$_1$, d$_2$)+⌈$2^{-L}$·d$_0$·evk⌉(mod R'$_1$) of two input homomorphic cyphertexts (c$_{t1}$=(a$_1$, b$_1$), ct$_2$=(a$_2$, b$_2$)), and the multiplication value (ct$_{mult}$) may be a ciphertext for the tensor $\hat{z}_1\odot\hat{z}_2$. Here, (d$_0$, d$_1$, d$_2$)=(a$_1$a$_2$, a$_1$b$_2$+a$_2$b$_1$, b$_1$b$_2$)(mod R'$_1$).

Rescaling (MHEAAN.Dec$_{sk}$(ct,p))

Rescaling is a modular operation using an integer (p) in an input ciphertext, and the following Equation 17 may be calculated.

$$ct' \leftarrow \lfloor 2^{-P} \cdot ct \rfloor (\text{mod } \mathcal{R}'\ell_{-p}) \qquad \text{[Equation 18]}$$

Here, ct is the input ciphertext, and ct is a rescaled ciphertext.

Meanwhile, when the following Equation 19 is satisfied for an integer vector (k=(k$_0$, ..., k$_s$)), a conversion operation such as Equation 19 may be used for a conjugate or a rotation operation.

$$\kappa_k : m'(x) \to m'(x^k)(\text{mod } \mathcal{R}'\ell_{)} \qquad \text{[Equation 19]}$$

Conjugate (MHEAAN.Conjugate$_{cjk}$(ct))

If a conjugation key (cjk) is set as shown in Equation 20, a conjugation result as in Equation 21 may be output.

$$cjk \leftarrow \text{MHEAAN.KSGen}_{sk}(\kappa_{-1}(s)) \qquad \text{[Equation 20]}$$

$$ct_{cj} \leftarrow (0,b') + \lfloor 2^{-L} \cdot a' \cdot cjk \rfloor (\text{mod } \mathcal{R}'\ell) \qquad \text{[Equation 21]}$$

Here, (a', b') is (k$_{-1}$(a), k$_{-1}$(b))(mod R'$_1$), and ct$_{cj}$ may be a conjugation result and may be a ciphertext for a conjugated plaintext tensor.

Matrix Rotation (MHEAAN.Rotater$_{rtk}$(ct;r))

If a rotation key (rtk) is set as shown in Equation 22, a rotation result as in Equation 23 may be output.

$$rtk \leftarrow \text{MHEAAN.KSGen}_{sk}(\kappa_{g^r}(s)) \qquad \text{[Equation 22]}$$

$$ct_{rt} \leftarrow (0,b') + \lfloor 2^{-L} \cdot a' \cdot rtk \rfloor (\text{mod } \mathcal{R}'\ell) \qquad \text{[Equation 23]}$$

Here, (a', b') is (k$_{g^r}$(a), k$_{g^r}$(b))(mod R'$_1$), and ct$_{rt}$ is a rotation result and may be a ciphertext for a plaintext (rt($\hat{z}$,r)) rotated by r$_i$ in an i dimension.

As such, hardness of the m-RLWE problem for a ring appears to be reduced from the RLWE problem. Also, MHEAAN has all the advantages of HEAAN, such as rescaling. Also, this scheme may be a reasonable solution for approximation of complex values. Hereinafter, a two-dimensional (2D) structure supporting a matrix operation such as a 2D structure standard HE operation will be described.

As described above, when the MHEAAN technology according to the disclosure is applied, matrix multiplication may be easily performed using a Fox matrix multiplication algorithm in case of a 2D case corresponding to a matrix of a plaintext slot. Also, a ring is not required to be exponentially large, and matrix multiplication may be performed as part of a complex algorithm.

In addition, since the MHEAAN technology can be combined with a divide and conquer algorithm, a matrix size is not a problem. Various matrix operations such as matrix conversion may be performed.

As described above, the operating device according to the disclosure may multidimensionally pack a plurality of messages by using multivariates, so that it is possible to operate with low complexity in a matrix multiplication process for ciphertexts packed with multivariates.

Meanwhile, in the illustration and description of FIG. 2, the operating device also generates a key, performs message encryption, and also performs decryption on the ciphertext, but in actual implementation, the operating device may perform only some of the operations, such as generating only a key, performing only an encryption operation, or performing only computation on a ciphertext.

Figure 3:
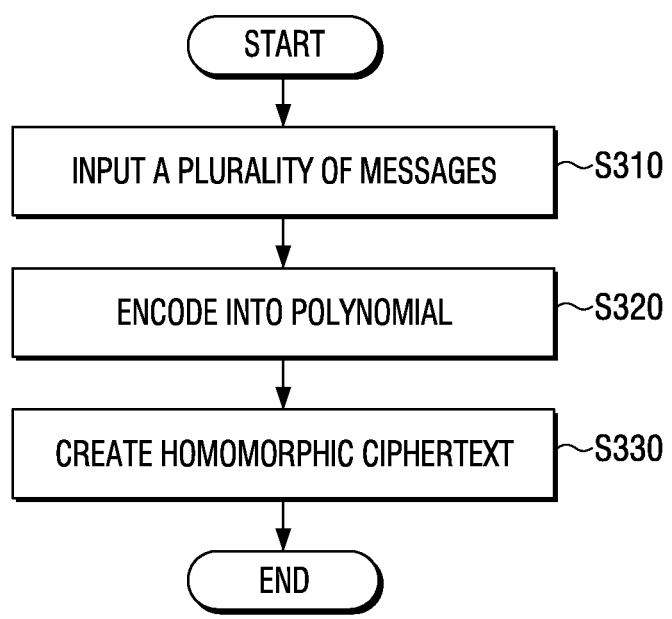
FIG. 3 is a flowchart illustrating an encryption method according to an embodiment of the disclosure.

FIG. 3 is a flowchart illustrating an encryption method according to an embodiment of the disclosure.

Referring to FIG. 3, first, a plurality of messages are received (S310). For example, the plurality of messages may be received from an external device, may be generated internally in the device, or may be input by a user. In addition, some of the plurality of messages may be generated by itself, and others may be received from the outside or input by a user.

The plurality of messages are encoded as a polynomial defined by multivariates (S320). Specifically, the plurality of messages may be arranged as a multidimensional tensor corresponding to the number of multivariates, and the plurality of messages arranged as a multidimensional tensor may be encoded in a polynomial form. For example, when the multivariates are two variates including x and y, the plurality of messages may be arranged in a matrix form including a plurality of columns and a plurality of rows, and the plurality of messages arranged in a matrix form may be encoded as a polynomial defined by a first variate (x) and a second variate (y).

Also, a homomorphic ciphertext may be generated by encrypting the polynomial defined by multivariates.

Meanwhile, when the homomorphic ciphertext as described above is generated, computation processing may be performed on the generated homomorphic ciphertext. Such computation processing may target one homomorphic ciphertext and may be an operation such as addition, multiplication, subtraction, and matrix multiplication for a plurality of homomorphic ciphertexts. Hereinafter, various computation operations according to the disclosure will be described with reference to FIGS. 4 to 12.

As described above, in the encryption method of the disclosure, a plurality of messages may be multidimensionally packed using multivariates, and thus computation may be performed with low complexity in a matrix multiplication process for ciphertexts packed with multivariates. The encryption method shown in FIG. 3 may be performed in the operating device of FIG. 2 and may be implemented in the form of a program code for performing each step.

FIG. 4 is a view illustrating a row summing method according to an embodiment of the disclosure. Hereinafter, for ease of explanation, a ciphertext obtained by encoding the matrix (A) into a polynomial defined by multivariates using a tensor is referred to as ct$_A$.

Referring to FIG. 4, row summation (or column summation) may be implemented by repeating a rotation process of the ciphertext ct$_A$ and the addition operation of a rotation process result and the input ciphertext a predetermined number of times.

The computation result may be similar to a ciphertext for a row sum value of the matrix (A).

FIG. 5 is a view illustrating a diagonal extraction method according to an embodiment of the disclosure.

Referring to FIG. 5, a diagonal extraction operation may be performed by multiplying the input ciphertext with a constant ($I_k$) and rescaling the multiplication-processed result. Here, $I_k$ is rt(I, (k,0)) and may be an identity matrix.

FIG. 6 is a view illustrating a matrix by vector multiplication method according to an embodiment of the disclosure.

When the ciphertext $ct_v$ is a ciphertext of a vector v having an n×1 matrix size, $ct_v$ may be considered as a ciphertext having an n matrix size including the same columns of the vector.

If $ct_A^T$ is multiplied by $ct_v$ and a column summation (col Sum) algorithm is applied, a ciphertext in which $w^T=(Av)^T$ having a size of 1×n is encrypted may be obtained.

Such vector multiplication may be performed by ciphertext multiplication for $ct_A^T$, rescaling for $ct_{(Av)}^T$, and column summing for rescaled $ct_{(Av)}^T$, as shown in FIG. 6.

FIG. 7 is a view illustrating a matrix multiplication method according to an embodiment of the disclosure.

A fox matrix multiplication algorithm may be used for encrypted matrix multiplication. For example, if $(ct_A, \beta_A \cdot 2^p, 2^p, 1)$ and $(ct_B, \beta_B \cdot 2^p, 2^p, 1)$ are ciphertexts for A and B, respectively, a matrix multiplication of $(ct_C, \beta_C \cdot 2^p, 2^p, 1)$ which is a ciphertext for C=AB may be output. Here, $\beta_C = \beta_A + \beta_B + (\log n+1) \cdot \beta^*$.

Referring to FIG. 7, in order to calculate some component values among a plurality of components constituting C, diagonal extraction for $ct_B$, rotation processing for $ct_{Bk}$, summing a rotation processing result and a diagonal extraction result, rotation processing for $ct_A$, a mode-down processing for a rotation processing result, and a matrix multiplication operation of $ct_{Ak}$ and $ct_{Bk}$, and an addition operation of $ct_C$ and $ct_{Ck}$ may be repeatedly performed to calculate all component values of C.

For example, in case of performing C=A×B matrix multiplication, first, two matrices A and B may be converted into a vector (in this case, m2≤n).

Also, a component $a_{i,j}$ of a m×m matrix A may be disposed in a m(i−1)+j-th component of the vector, and a component $b_{i,j}$ of a m×m matrix B may be disposed in a m(k−1)+j-th component.

Meanwhile, multiplication of two matrices may be expressed as a Hadamard product. For example, first n components of the Hadamard product may be listed in order of $a_{11}b_{11}, a_{12}b_{21}, \ldots, a_{1m}b_{m1}$, and next n components thereof may be listed in order of $a_{21}b_{12}, a_{22}b_{22}, \ldots, a_{2m}b_{m2}$.

Also, m components of the vector may be added through slot shifting each time. A resulting vector may appear as $c_{11}$ for a first digit, $c_{22}$ for a (m+1)-th digit, and $c_{33}$ for a (2m+1)-th digit.

Through this process, some component values of C may be extracted, and the remaining component values of C may also be extracted by moving the component arrangement of A by m places and repeating the operations such as multiplication described above.

In the above process, the vector obtained in each step uses only m of the total $m^2$ components, and the remaining components are computed in the algorithm but a result thereof is not reflected in an actual matrix multiplication result, so the computation is wasted. For example, if the vector obtained by the Hadamard product is added by slot shifting, the second component is $a_{12}b_{21} + \ldots + a_{1m}b_{m1} + a_{21}b_{12}$, and this value is a computation unrelated to the components of C.

Therefore, in case of implementation, a computation speed and resources may be reduced by not performing computation on the part that is not reflected in the computation result.

When a dimension of a base ring is N, addition and multiplication should be used by about O(N2) in matrix multiplication of HEAAN, which may be improved to use about O(N) in MHEAAN.

Meanwhile, the matrix multiplication described above may be performed more efficiently by using B', C'' substitution as in Equation 24.

$$B' = \begin{bmatrix} b_{0,0} & b_{1,n-1} & \cdots & b_{n-1,1} \\ b_{0,1} & b_{1,0} & \cdots & b_{n-1,2} \\ \vdots & & \ddots & \vdots \\ b_{0,n-1} & b_{1,n-2} & \cdots & b_{n-1,0} \end{bmatrix},$$

[Equation 24]

$$C'' = \begin{bmatrix} c_{0,0} & c_{0,n-1} & \cdots & c_{0,1} \\ c_{1,1} & c_{1,0} & \cdots & c_{1,2} \\ \vdots & & \ddots & \vdots \\ c_{n-1,n-1} & c_{n-1,n-2} & \cdots & c_{n-1,0} \end{bmatrix}$$

When encryption is performed on A and B', C'', which is a permutation matrix for matrix C, may be output according to the algorithm of FIG. 8.

FIG. 8 is a view illustrating a matrix multiplication of a permutation matrix according to an embodiment of the disclosure.

Referring to FIG. 8, a matrix multiplication operation may be performed through an operation of repeatedly performing rotation processing of two matrices $ct_A$ and $ct_B$, multiplication operation, and addition processing of a multiplication result.

For example, matrix multiplication may include an operation of extracting some component values of a matrix multiplication result through a Hadamard multiplication operation for a plurality of homomorphic ciphertexts and a component summation of results of the Hadamard multiplication operation. In addition, an operation of extracting all component values of C may be performed by repeating the operation described by performing rotation processing (slot shifting) on one of the plurality of homomorphic ciphertexts.

FIG. 9 is a view illustrating a method of generating a transposition matrix according to an embodiment of the disclosure. Here, the transposition matrix refers to a matrix ($A^T$) in which rows and columns are exchanged for a certain matrix A.

Meanwhile, all of the shifted diagonals of the matrix A may be extracted using a diagonal extraction algorithm. It can be confirmed that the transposition matrix $A^T$ includes the shifted diagonals $A_k$ of the matrix A.

In this regard, referring to FIG. 9, the operation of finding the transposition matrix for the ciphertext is performed by repeatedly performing a diagonal extraction operation for the corresponding ciphertext, an operation of rotating the extracted diagonal, and an operation of summing the rotated values a predetermined number of times.

FIG. 10 is a view illustrating an inverse matrix operation method according to an embodiment of the disclosure.

The inverse matrix operation may be implemented by applying the Schulze algorithm to an approximate inverse circuit. Specifically, as shown in FIG. 10, the inverse matrix operation may be calculated through encoding for I value, mode down processing, matrix multiplication processing for $ct_A$, rescaling for $ct_A$ matrix multiplication processing, $ct_v$ matrix multiplication processing, rescaling for $ct_v$ matrix multiplication processing.

Meanwhile, MHEAAN may be applied to a DNN classification algorithm having a certain number of layers. These algorithms are non-interactive and may maintain a model itself encrypted.

Such a DNN classification model may include l+1 layers, and may include ni nodes in each layer. Here, a 0-th layer may be an input layer, an l-th layer may be an output layer, and the remaining layers may be hidden layers.

Each hidden layer and the output layer have a corresponding weighting matrix ($W_i$) and a bias vector ($b_i$), and for an input vector ($a_0$), a linear transformation part ($z_i = W_i a_{i-1} + b_i$) and an activation part ($a_i = g_i(z_i)$) in each hidden layer may be continuously calculated.

Also, in the output layer, the linear transformation part ($z_l = W_l a_{l-1} + b_l$) and an index of the largest value in $z_l$ may be calculated.

For the linear transformation part in the above description, the algorithm of FIG. 11 or FIG. 12 may be used. For example, for all hidden layers, a sigmoid may be used as an activation function, and a polynomial approximation of the sigmoid function may be used for an activation part. In particular, a seventh-order equation may be used, and an example thereof is as shown in Equation 25.

$$g(x) = 0.5 - 1.73496 \cdot \frac{x}{8} + 4.19407 \cdot \left(\frac{x}{8}\right)^3 - 5.43402 \cdot \left(\frac{x}{8}\right)^5 + 2.50739 \cdot \left(\frac{x}{8}\right)^7 \quad \text{[Equation 25]}$$

Meanwhile, by using the algorithm as shown in FIG. 11, $ct_{a0}$, $ct_{W1}^T$, and $ct_{b1}^T$ may be input to the corresponding algorithm, and $ct_{z1}^T$ may be obtained.

Then, $ct_{z1}^T$ may be evaluated using a polynomial approximation (g(x)) of the sigmoid function.

Thereafter, by using the algorithm as shown in FIG. 12, a p coefficient bit is lost for each linear transform unit, and 3p+3 modulus bits are lost in each activation unit. Since an initial coefficient bit L is sufficiently large and boot scraping is used, DNN classification having a certain number of layers may be evaluated.

Meanwhile, although only the deep neural network has been mentioned in the above, the disclosure may also be applied to a convolutional neural network (CNN) or a recurrent neural network (RNN) when implemented.

FIG. 11 is a view illustrating a method of linear transformation from a column to a row according to an embodiment of the disclosure.

Referring to FIG. 11, by using the vector multiplication operation as shown in FIG. 6, a vector multiplication operation is performed on $ct_a$ and $ct_W^T$, and an operation result ($ct_{(Wa)}^T$) and $ct_b^T$ may be added to output, $ct_z^T$.

FIG. 12 is a view illustrating a method of linear transformation from a row to a column according to an embodiment of the disclosure.

Referring to FIG. 12, by using the vector multiplication operation as shown in FIG. 6, a vector multiplication operation is performed on $ct_a^T$ and $ct_W$, and an operation result ($ct_{Wa}$) and $ct_b$ may be added to output ctz.

As described above, the MHEAAN according to the disclosure uses HEAAN that performs approximate homomorphism, may perform an efficient operation on a matrix through multidimensional packing, and supports bootstrapping that works well even when it has many slots.

Meanwhile, the ciphertext processing method according to various embodiments described above may be implemented in a form of a program code for performing each process, stored in a recording medium, and distributed. In this case, a device on which the recording medium is mounted may perform operations such as the encryption or ciphertext processing.

The recording medium may be various types of computer-readable recording media such as a ROM, a RAM, a memory chip, a memory card, an external hard disk, a hard disk drive, a compact disc (CD), a digital versatile disc (DVD), a magnetic disk, and a magnetic tape.

Although the description of the disclosure has been made with reference to the accompanying drawings, the scope of the rights of the disclosure is defined by the appended claims and is not construed as being limited to the described embodiments and/or the drawings. In addition, it should be understood that various improvements, modifications and changes of the embodiments described in the claims which are obvious to those skilled in the art are included in the scope of rights of the disclosure.

The invention claimed is:

1. An encryption method comprising:
   receiving a plurality of messages;
   encoding the plurality of messages into a polynomial defined by multivariates; and
   encrypting the polynomial defined by the multivariates to generate a homomorphic ciphertext,
   wherein the multivariates include a first independent variate and a second independent variate that are independent of each other, and
   wherein, in the encoding, each of the plurality of messages are arranged in a slot of a matrix form including a plurality of columns and a plurality of rows, and each of the plurality of messages arranged in the matrix form are encoded into a coefficient of the polynomial defined by the first independent variate and the second independent variate.

2. The encryption method of claim 1, wherein, in the encoding, each slot of the matrix is converted into coefficients of the polynomial defined by the first independent variate and the second independent variate.

3. The encryption method of claim 1, further comprising:
   performing computation processing on a plurality of homomorphic ciphertexts.

4. The encryption method of claim 3, wherein
   the computation processing is a matrix multiplication, and
   the performing of the computation processing includes:
      performing a Hadamard product operation on the plurality of homomorphic ciphertexts;
      calculating a partial component value of a result of the matrix multiplication by adding components of a result of the Hadamard product operation; and
      repeating the Hadamard product operation and the calculating operation by shifting a component position in one of the plurality of homomorphic ciphertexts.

5. The encryption method of claim 4, wherein, in the performing of Hadamard product operation, Hadamard product operation is performed only on a component reflected for calculation of the partial component value among a plurality of components constituting the plurality of homomorphic ciphertexts.

6. An operating device comprising:
   a memory configured to store at least one instruction and a plurality of predetermined prime number information; and a processor configured to execute the at least one instruction, wherein the processor encodes a plurality of messages into a polynomial defined by multivariates by executing the at least one instruction, and encrypts the polynomial defined by the multivariates to generate a homomorphic ciphertext, wherein the multivariates include a first independent variate and a second independent variate that are independent of each other, and wherein the processor arranges each of the plurality of messages in a slot of a matrix form including a plurality of columns and a plurality of rows, and encodes each of the plurality of messages arranged in the matrix form into a coefficient of the polynomial defined by the first independent variate and the second independent variate.

7. The operating device of claim 6, wherein the processor converts each slot of the matrix into coefficients of the polynomial defined by the first independent variate and the second independent variate.

8. The operating device of claim 6, wherein the processor performs computation processing on a plurality of homomorphic ciphertexts.

9. The operating device of claim 8, wherein the computation processing is a matrix multiplication, and
the processor performs a Hadamard product operation on the plurality of homomorphic ciphertexts, calculates a partial component value of a result of the matrix multiplication by adding components of a result of the Hadamard product operation, and calculates the entire component value of the result of the matrix multiplication by repeating the Hadamard product operation and the calculating operation by shifting a component position in one of the plurality of homomorphic ciphertexts.

10. The operating device of claim 9, wherein the processor performs a Hadamard product operation for each component reflected in the calculation of the partial component value, among a plurality of components constituting the plurality of homomorphic ciphertexts.

* * * * *